United States Patent
Kim

(10) Patent No.: US 9,596,331 B2
(45) Date of Patent: Mar. 14, 2017

(54) ELECTRONIC APPARATUS HAVING INTERFACE TO WIRELESSLY COMMUNICATE WITH INTERNAL WIRELESS DEVICE DISPOSED IN A HOUSING OF THE ELECTRONIC APPARATUS AND A METHOD THEREOF

(71) Applicant: Seungman Kim, McLean, VA (US)

(72) Inventor: Seungman Kim, McLean, VA (US)

(73) Assignee: Seungman Kim, McLean, VA (US)

( * ) Notice: Subject to any disclaimer, the term of this patent is extended or adjusted under 35 U.S.C. 154(b) by 4 days.

(21) Appl. No.: 14/594,103

(22) Filed: Jan. 10, 2015

(65) Prior Publication Data

US 2016/0205227 A1 Jul. 14, 2016

(51) Int. Cl.
*H04B 1/38* (2015.01)
*H04M 1/02* (2006.01)
*H04M 1/725* (2006.01)

(52) U.S. Cl.
CPC .......... *H04M 1/026* (2013.01); *H04M 1/7253* (2013.01)

(58) Field of Classification Search
CPC ..... H04W 4/008; H04W 76/02; H04W 84/12; H04W 8/005; G06Q 20/3278
See application file for complete search history.

(56) References Cited

U.S. PATENT DOCUMENTS

| | | | |
|---|---|---|---|
| 8,262,397 B1 * | 9/2012 | Van der Steen ... | G06K 13/0818 439/159 |
| 8,921,993 B2 | 12/2014 | Choi et al. | |
| 2005/0228919 A1 * | 10/2005 | Trainin .................. | G06F 13/24 710/260 |
| 2008/0182667 A1 * | 7/2008 | Davis ...................... | G07F 17/32 463/43 |
| 2008/0287134 A1 * | 11/2008 | Catovic ................. | H04W 68/02 455/445 |
| 2014/0367866 A1 | 12/2014 | Haba et al. | |
| 2014/0370806 A1 | 12/2014 | Atkinson | |
| 2014/0374900 A1 | 12/2014 | Kwon et al. | |
| 2014/0374902 A1 | 12/2014 | Lee et al. | |

* cited by examiner

*Primary Examiner* — Kwasi Karikari
(74) *Attorney, Agent, or Firm* — EIPG

(57) ABSTRACT

An electronic apparatus includes a housing, first, second, and third interface units disposed in the housing, an internal wireless device, and a controlling/processing unit disposed in the housing to control the first interface unit to communicate with a user, to control the second interface unit to communicate with an external apparatus, and to control the third interface unit to wirelessly communicate with the internal wireless device when the internal wireless device exists in the housing.

20 Claims, 12 Drawing Sheets

ELECTRONIC APPARATUS HAVING INTERFACE TO WIRELESSLY COMMUNICATE WITH INTERNAL WIRELESS DEVICE DISPOSED IN A HOUSING OF THE ELECTRONIC APPARATUS AND A METHOD THEREOF

BACKGROUND OF THE INVENTIVE CONCEPT

1. Field of the Invention

The present inventive concept relates to a wireless device, an electronic apparatus having an interface to communicate with an internal wireless device, and a method thereof.

2. Description of the Related Art

A conventional electronic device, for example, a computer apparatus, a mobile device, etc., includes a housing, one or more components installed in the housing and connected to each other through a conductive material, and one or more interfaces to receive a user input and to communicate with an external apparatus. Here, the components may include a semiconductor device, a processor, a memory device, etc., to perform one or more functions of the electronic apparatus. However, the components are mounted at a fixed position of the housing and connected through the conductive material, for example, a conductive line or cable. Therefore, it is inconvenient to install the components at fixed positions within an internal space of the electronic device.

SUMMARY OF THE INVENTIVE CONCEPT

The present inventive concept provides a wireless electronic device to be disposed in a housing of an electronic apparatus.

The present inventive concept provides an electronic apparatus having a housing, a wireless electronic device disposed in the housing, and an interface to wirelessly communicate with the wireless electronic device.

The present inventive concept provides a method of providing a wireless electronic device in a housing of an electronic apparatus for a wireless communication.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing an electronic apparatus having a housing, the electronic apparatus including first, second, and third interface units disposed in the housing, an internal wireless device having a sub-housing containing a circuit board, a semiconductor chip unit mounted on the circuit board, and an internal wireless interface unit mounted on the circuit unit and electrically connected to the semiconductor chip unit, and a controlling/processing unit dispose in the housing to control the first interface unit to communicate with a user, to control the second interface unit to communicate with an external apparatus, and to control the third interface unit to wirelessly communicate with the internal wireless interface of the internal wireless device to transmit or receive data when the internal wireless device exists in the housing.

The semiconductor chip unit and the internal wireless interface unit may be disposed on a same side of the circuit board.

The semiconductor chip unit and the internal wireless interface unit may be disposed on opposite sides of the circuit board.

The circuit board may be exposed through a portion of the sub-housing.

The internal wireless interface unit may include a data interface and a power interface.

The internal wireless interface unit may include an antenna disposed to face the third interface unit.

The internal wireless interface unit may include a terminal extended through the sub-housing.

The circuit board may include a terminal protruding through the housing.

The internal wireless interface unit and the third interface unit may communicate with each other using near field communication.

The internal wireless device may include an insulation material filled in the housing.

The internal wireless device may be movably disposed within a space of the housing.

The internal wireless device may include two internal wireless devices movably disposed in the housing without being fixed on the housing.

The electronic apparatus may further include one or more stoppers to restrict a movement of the internal wireless device.

The electronic apparatus may further include a main circuit board, and the first, second, and third interface units may be fixedly mounted on the main circuit board.

The electronic apparatus may further include a partition formed in the housing to define a space to accommodate the internal wireless device.

The electronic apparatus may further include a main circuit board disposed in a first space of the housing and mounted with the first, second, and third interface units, and the internal wireless device may be disposed in a second space of the housing.

The internal wireless device may include a semiconductor package having a processor and a memory.

The foregoing and/or other features and utilities of the present inventive concept may be achieved by providing an internal wireless device including a sub-housing containing a circuit board, a semiconductor chip unit mounted on the circuit board, and an internal wireless interface unit mounted on the circuit unit and electrically connected to the semiconductor chip unit.

The foregoing and/or other features and utilities of the present inventive concept may be achieved by providing a method of performing an operation of an electronic apparatus, the method including providing first, second, and third interface units in the housing, providing an internal wireless device having a sub-housing containing a circuit board, a semiconductor chip unit mounted on the circuit board, and an internal wireless interface unit mounted on the circuit unit and electrically connected to the semiconductor chip unit; controlling the first interface unit to communicate with a user, controlling the second interface unit to communicate with an external apparatus, and controlling the third interface unit to wirelessly communicate with the internal wireless interface of the internal wireless device to transmit or receive data when the internal wireless device exists in the housing.

The foregoing and/or other features and utilities of the present inventive concept may be achieved by providing a non-transitory computer-readable medium to contain computer-readable codes as a program to perform the method describe above or hereinafter.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
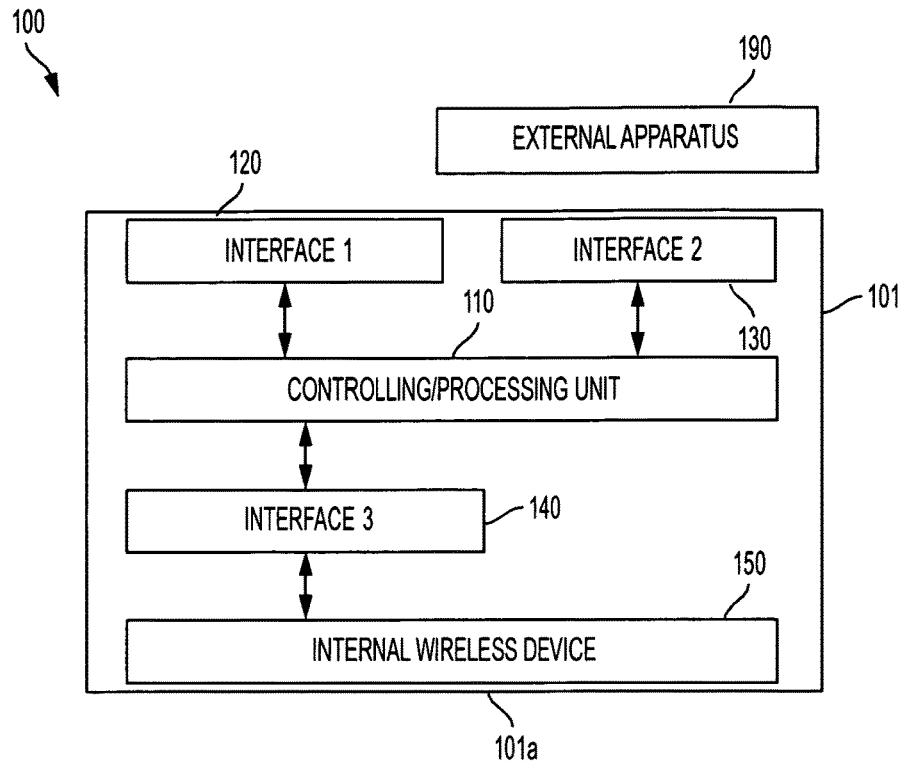
FIG. 1 is a diagram illustrating an electronic apparatus according to an embodiment of the present inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 is a diagram illustrating an electronic apparatus 100 according to an embodiment of the present inventive concept. The electronic apparatus 100 may be a computer apparatus, a mobile apparatus, a mobile phone, a tablet computer, etc. The electronic apparatus 100 may include a housing 101, a controlling/processing unit (or control unit) 110, first, second, and third interface units 120, 130, and 140, and an internal wireless device 150. The controlling/processing unit 110, the first, second, and third interface units 120, 130, and 140, and the internal sing ireless device 150 may be disposed in the housing 101 as a single integral body.

The first interface unit 120 may be a user interface or an input/output unit to output audio and video signals (display an image on a screen of display element) and/or to receive a user data or command input through a user input element (for example, button, keyboard, or touch panel of the display element). The input/output unit may be a touch panel, for example, to display an image including a menu icon and to receive a user touch input so that the image and the menu icon are controlled or selected according to a user touch or gesture. The first interface unit 120 may be installed inside the housing 101 or may have a portion exposed to an outside of the housing 101 to communicate with a user.

When the electronic apparatus 100 is a desk top computer, the first interface unit 120 may include terminals formed on the housing 101 to be connected to external key board, mouse, and display unit through a wired or wireless communication method. When the electronic apparatus 100 is a laptop computer, the first interface unit 120 may include a keyboard, a mouse, and a display unit which are exposed through the housing 101. When the electronic apparatus 100 is a mobile device, for example, a smart phone or a tablet computer, the first interface unit 120 may include one or more switches formed on the housing 101 and a touch panel formed on a surface of the housing 101. When the electronic apparatus 100 is a home appliance, for example, a television apparatus or a refrigerator, the first interface unit 120 may include buttons and/or a remote controller to control functions of the electronic apparatus 100. However, the present inventive concept is not limited thereto. It is possible that the first interface unit 120 may include a display panel to display status of the electronic apparatus 100 or a control menu.

The electronic apparatus 100 may include one or more components to perform a function or operation of the electronic apparatus 100 according to a control of the controlling/processing unit 110. For example, when the electronic apparatus 100 is a game machine, the controlling/processing unit 110 may control the components, for example, a display and an audio, including the first, second, and/or third interface units 120, 130, and/or 140 to provide a game function or operation to a user. The game function may be changed or modified to another game function according to data of the internal wireless device 150. When the electronic apparatus 100 is a cleaning machine, the controlling/processing unit 110 may control the components to perform a cleaning function or operation. The cleaning function may be changed or modified to another cleaning function according to data stored in the internal wireless device 150. The data may be data of a floor plan, housing structure, etc., usable for a cleaning function. When the electronic apparatus 100 is a vehicle, the vehicle is driven according to data stored in the internal wireless device 150. When the electronic apparatus 100 is a medical device, the operation of the medical device can be changed or modified according to data stored in the internal wireless device 150. When the electronic apparatus 100 is a television set, an operation of the television set can be changed or modified to another operation according to data stored in the internal wireless device 150.

The second interface unit 130 may communicate with one or more external apparatuses 190 according to a wired or wireless communication method. The second interface unit 130 may include a wireless telephone unit, a WiFi unit (or WLAN unit), a Bluetooth unit, and/or Near field communication (NFC) unit. The wireless telephone unit, the WiFi unit, the Bluetooth unit, and NFC unit are well known, and thus detailed descriptions thereof will be omitted. The second interface unit 130 is usable to transmit data to the external apparatuses 190 or to receive data from the external apparatuses 190. The second interface unit 130 may have a portion, for example, an antenna, to be exposed to an outside of the housing 101. It is possible that the antenna may be disposed inside the housing 101.

The third interface unit 140 may communicate with an internal component installed or disposed inside the housing 101. The third interface unit 140 is usable to transmit data to the internal wireless device 150 and to receive data from the internal wireless device 150.

The wireless internal device 150 may include a memory and/or processor unit (for example, a semiconductor chip unit or semiconductor chip package) to store and/or process data and an internal wireless interface to wirelessly communicate with the third interface unit 140 for data transmission. The memory and/or processor unit may be a semiconductor device, an SSD, a read-only memory (ROM), a random-access memory (RAM), a flash memory, a semiconductor chip package, a hard disk drive (HHD), CD-ROMs, magnetic tapes, floppy disks, and optical data storage devices. The internal wireless interface is connected to the memory and/or processor unit and wirelessly communicates with the third interface 140. The wireless internal device 150 may be a wireless semiconductor package. The wireless semiconductor package includes a semiconductor package formed with one or more semiconductor chips and an internal wireless interface connected to the wireless semiconductor package and wirelessly communicating with the third interface unit 140. The wireless internal device 150 may have an antenna to communicate with the third interface unit 140.

The housing 101 may have the controlling/processing unit 110 and the first, second, and third interface units 120, 130, and 140 which are connected according to a wired communication method and fixedly mounted in the housing 101. The housing 101 may have a portion to provide a space to accommodate the wireless internal device 150. The space is disposed near the third interface unit 140 for wireless communication. However, the present inventive concept is not limited thereto. The space may be disposed within the housing to enable the wireless communication within the housing 101. When the wireless internal device 150 is disposed in the space of the housing 101 to communicate with the third interface 149. The portion may include a frame and an insulation material surrounded an inside or an outside of the frame to prevent an interference between the wireless internal device 150 and other units or components of the electronic apparatus 100.

The controlling/processing unit 110 may include a combination of components, for example, a semiconductor device, an SSD, a read-only memory (ROM), a random-access memory (RAM), a flash memory, a semiconductor chip package, a hard disk drive (HHD), CD-ROMs, magnetic tapes, floppy disks, and optical data storage devices. The controlling/processing unit 110 receives data through at least one of the first, second, and third interface units 120, 130, and 140 and processes data to output the processed data through the at least one of the first, second, and third interface units 120, 130, and 140. The controlling/processing unit 110 may control and perform functions of the electronic apparatus 100

The first, second, and third interface units 120, 130, and 140 may be initialized or activated to respectively communicate with a user, an external apparatus, and an internal wireless device when the electronic apparatus 100 is turned on. However, the present inventive concept is not limited thereto. It is possible that the first, second, and third interface units 120, 130, and 140 may be independently or separately initialized or activated according to a user design or preference. A user may set operations of the first, second, and third interface units 120, 130, and 140 though the first interface unit 120. It is possible that when the internal wireless device 150 have data or command to control the controlling/processing unit 110 and/or the first, second, and third interface units 120, 130, and 140, the controlling/processing unit 110 and/or the first, second, and third interface units 120, 130, and 140 may be set to perform a function of the electronic apparatus 100 according to the data or command of the internal wireless device 150. The data or command of the internal wireless device 150 may be data or command corresponding to a new function or operation different from an original function or operation of the electronic apparatus 100, the controlling/processing unit 150 receives the data or command through the third interface unit 140 and then control components of the electronic apparatus 100 to perform the new function or operation.

For example, the electronic apparatus 100 may include a general function to be provided to all users. When the internal wireless device 150 provides the data or command which is unique to a specific user using the electronic apparatus 100, the controlling/processing unit 110 may control the components to perform the unique function or operation according to the data or command of the internal wireless device 150.

The internal wireless device 150 may be disposed inside the housing 101 or inserted into a space provided by a portion of the housing 101 to wirelessly communicate with the third interface unit 140. The wireless internal device 150 may not be fixedly mounted in the housing 101. The internal wireless device 150 may have a power terminal to be connected to a power unit of the electronic apparatus 100 through a cable to be supplied with power. However, it is also possible that the internal wireless device 150 may have a wireless power unit to wirelessly receive power from a wireless power element of the power unit of the electronic apparatus 100. Accordingly, the electronic apparatus 100 may not need a wire or terminal at a fixed position of the housing 101 to be connected to the internal wireless device 150 for data transmission. The internal wireless device 150 may not need to be fixedly mounted in the housing 101. The internal wireless device 150 may be replaced with a new internal wireless device to provide new data to the electronic apparatus 100, and the electronic apparatus provides a space to accommodate an internal wireless device 150.

The wireless semiconductor device 150 may have an internal wireless interface unit (which will be described later) to communicate with the third interface 140. The internal wireless interface unit may include an antenna disposed to face the third interface 140 to perform the wireless communication when the wireless communication method is a near field communication (NFC) method. The antenna may be disposed away from a side 101a of the housing 101 and disposed near the third interface 140. When the third interface 140 is disposed between the wireless semiconductor 150 and the side 101a of the housing 101, the antenna of the internal wireless interface unit of the wireless semiconductor device 150 may be disposed at a portion opposite to the side 101a of the housing 101 with respect to the third interface 140.

Figure 2:
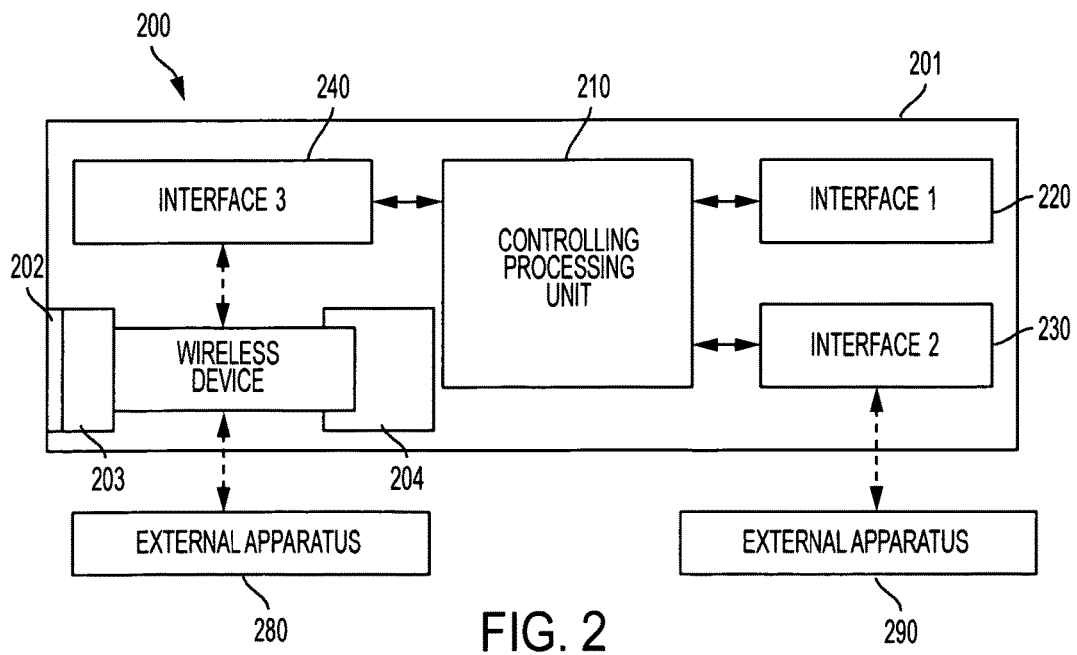
FIG. 2 is a diagram illustrating an electronic apparatus according to an embodiment of the present inventive concept.

FIG. 2 is a diagram illustrating an electronic apparatus 200 according to an embodiment of the present inventive concept. The electronic apparatus 200 includes a housing 201, a door (cover) 202 formed on a side of the housing 201 to move between an open position and a closed position with respect to the side of the housing 201, a controlling/processing unit 210, first, second, and third interface units 220, 230, and 240, a internal wireless semiconductor device 250 inserted through the door 202 at the open position, and one or more stoppers 203 and 204 disposed in a space of the housing 201 to surround one or more portions of the internal wireless semiconductor device 250. The stopper 203 may be attached to the door 202 and the stopper 204 may be mounted on the housing 201. It is possible that the stopper 203 and 204 may include an insulation material. The stopper 203 covers a side of the internal wireless semiconductor device 250 and the stopper 204 may surround a remaining side of the internal wireless semiconductor device 250.

The first and second interface units (or first and second interfaces) 220 and 230 of the electronic apparatus 200 of FIG. 2 may be similar to the first and second interface units 120 and 130 of the electronic apparatus 100 of FIG. 1 to communicate with a user and an external apparatus 290. The internal wireless semiconductor device 250 may communicate with the third interface unit (or third interface) 240 disposed inside the housing 201 and an external apparatus 280 disposed outside the housing 201. An antenna of an internal wireless interface unit of the internal wireless semiconductor device 250 may include two antennas disposed to face the third interface 240 and the external apparatus 280. The internal wireless semiconductor device 250 may communicate with the external apparatus 280 according to a control of the controlling/processing unit 210 in response to a user input. It is possible that the internal wireless semiconductor device 250 can communicate with the third interface unit 240 without a user input. When the electronic apparatus 200 is turned on, a wireless communication can be automatically performed between the third interface unit 240 and the internal wireless semiconductor device 250 upon detection of the internal wireless semiconductor. This may be a wireless connection and play as opposed to a plug (wired connection) and play.

Figure 3:
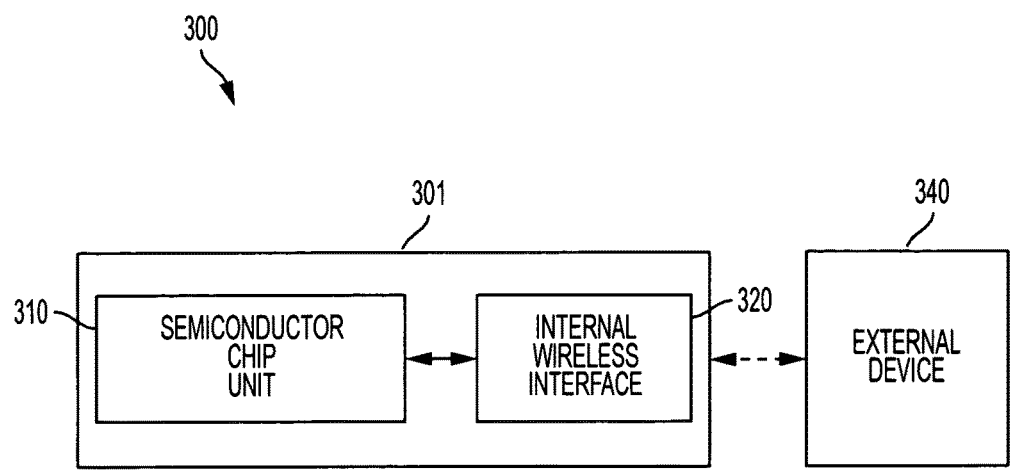
FIGS. 3 and 4 are views illustrating a wireless semiconductor device as an internal wireless device usable in an electronic apparatus according to an embodiment of the present general inventive concept.
Figure 4:
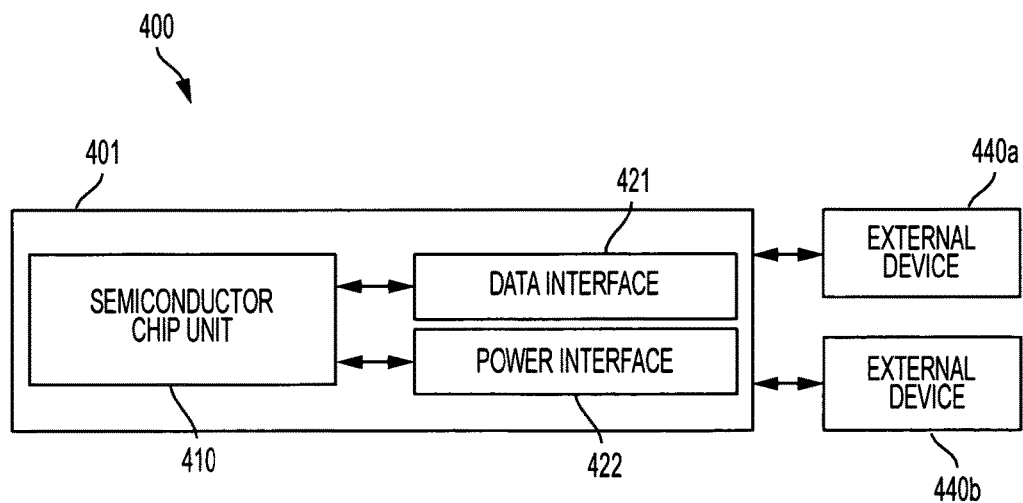
Figure 5:
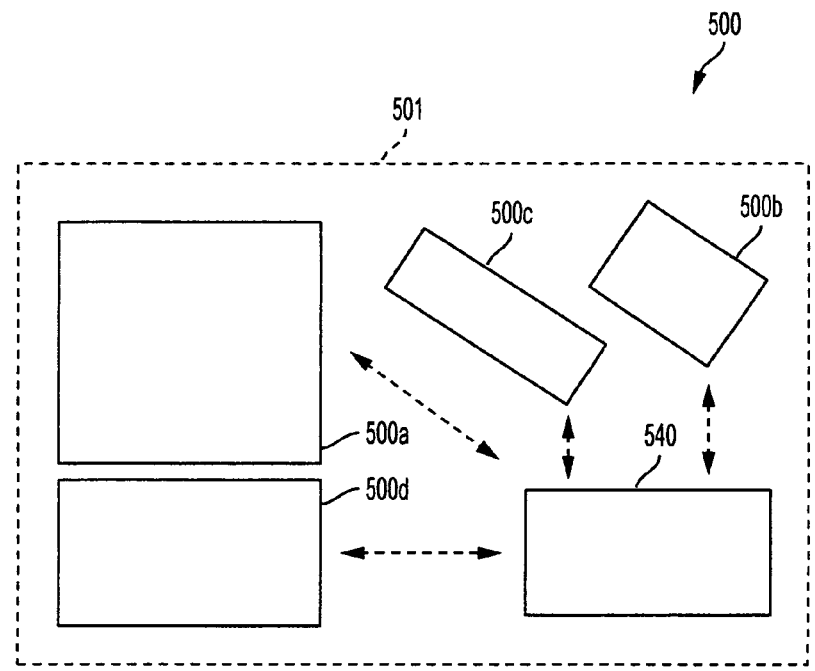
FIGS. 5, 6, 7, 8, and 9 are views illustrating an electronic apparatus having one or more internal wireless devices to perform a wireless communication in the electronic apparatus according to an embodiment of the present inventive concept.
Figure 6:
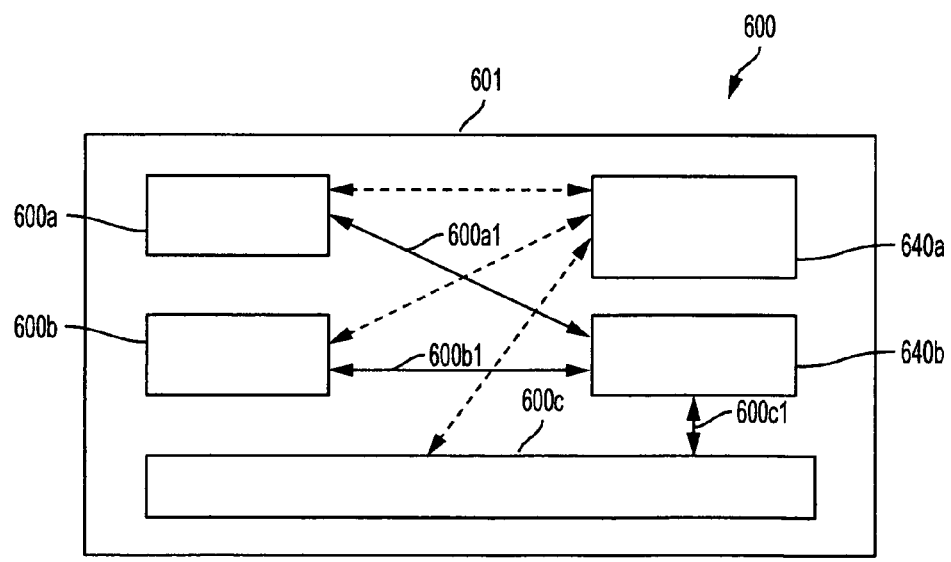
Figure 7:
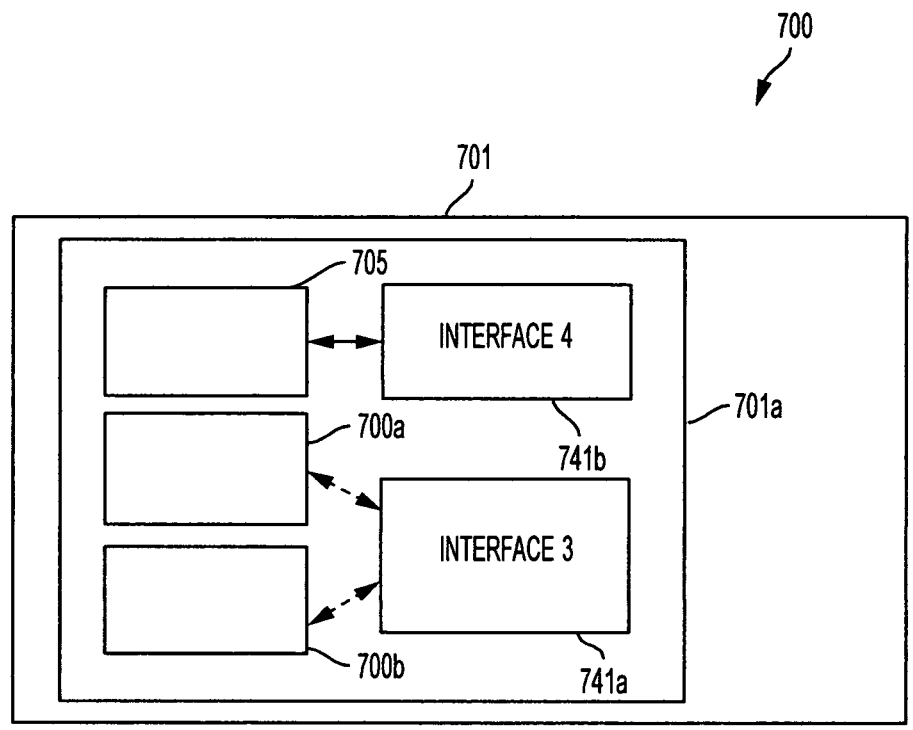
Figure 8:
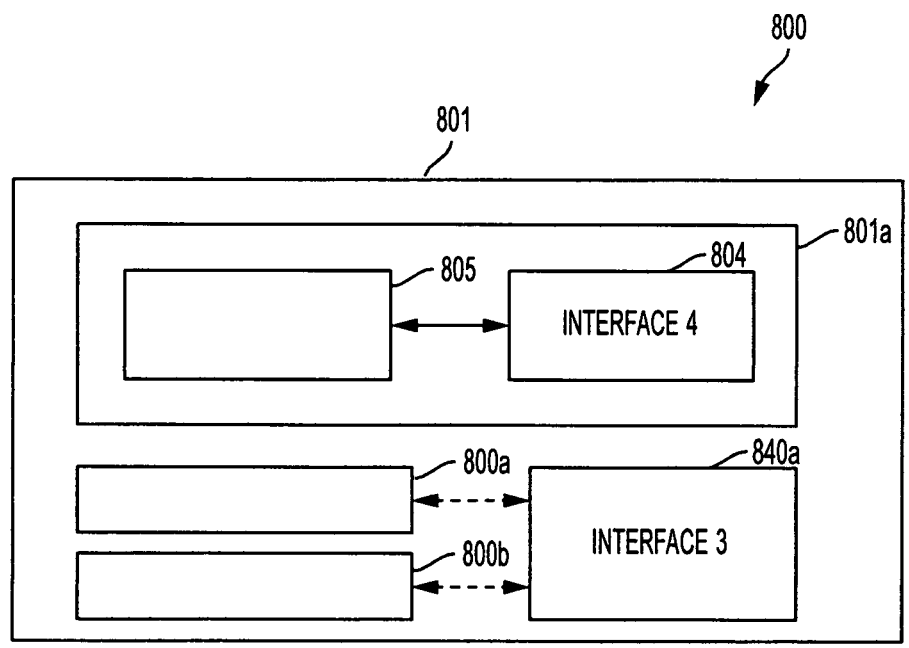
Figure 9:
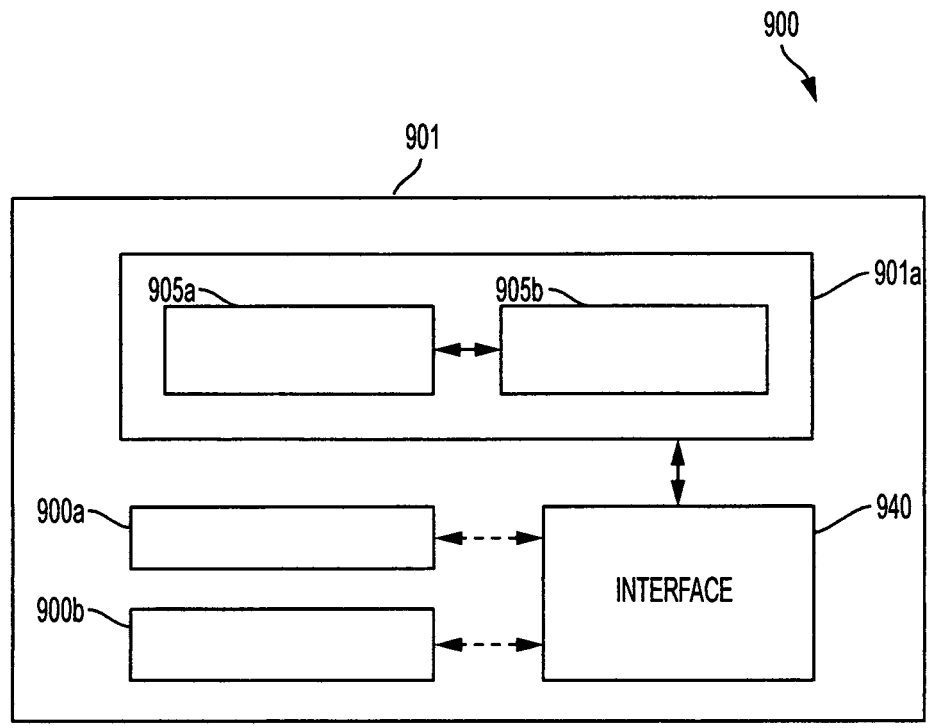
Figure 10:
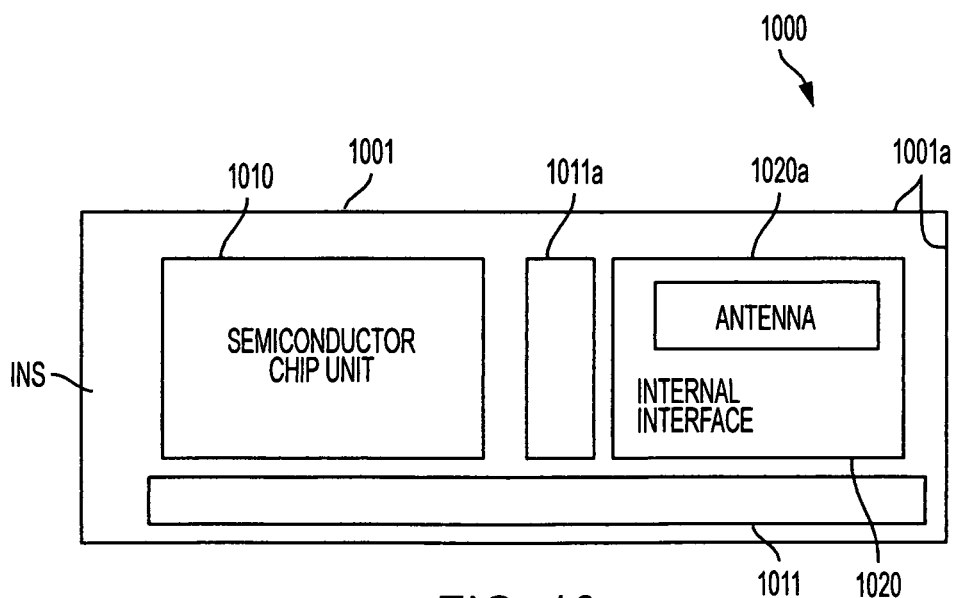
FIGS. 10, 11, 12A, 12B, and 12C are views illustrating a wireless semiconductor device as an internal wireless device usable in an electronic apparatus according to an embodiment of the present inventive concept.
Figure 11:
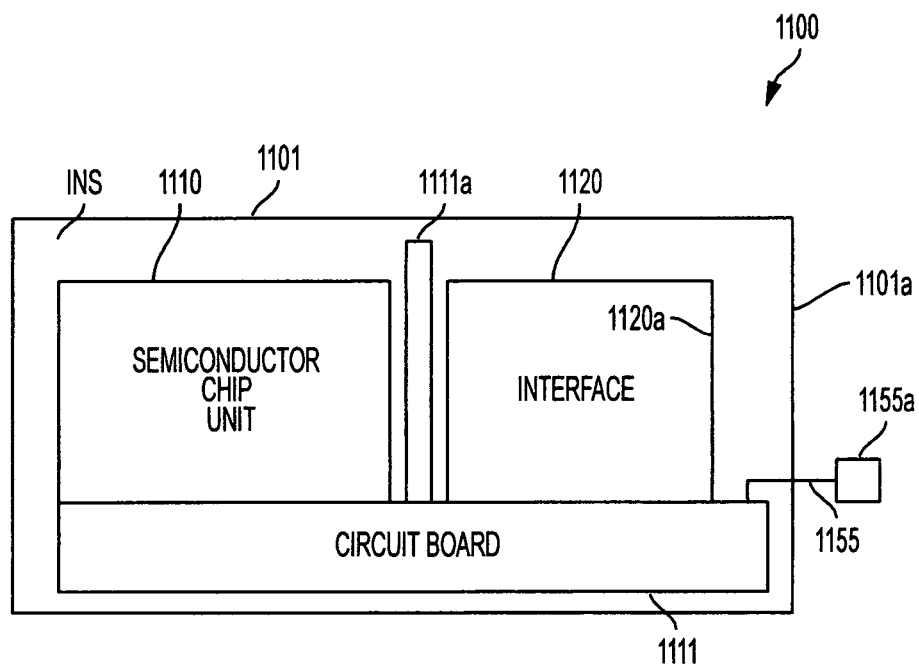
Figure 12A:
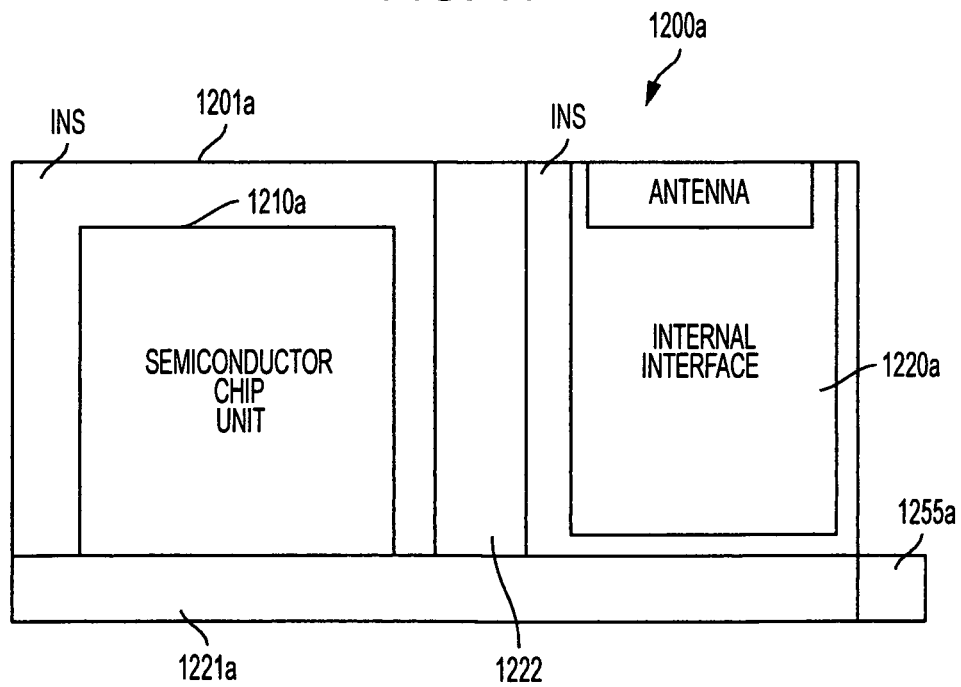
Figure 12B:
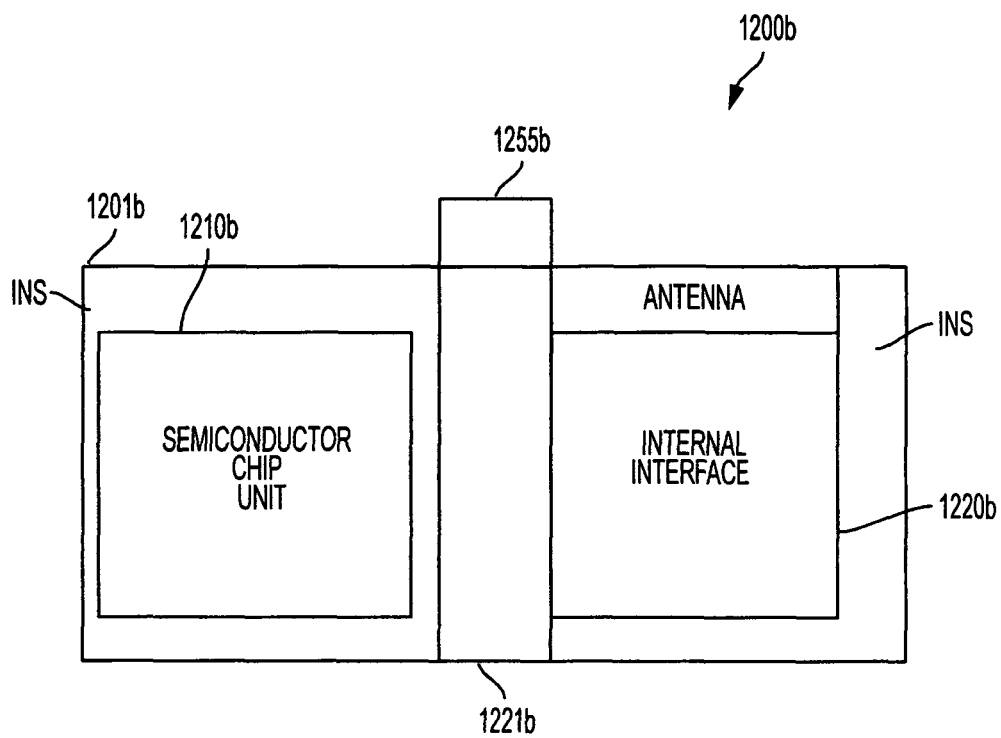
Figure 12C:
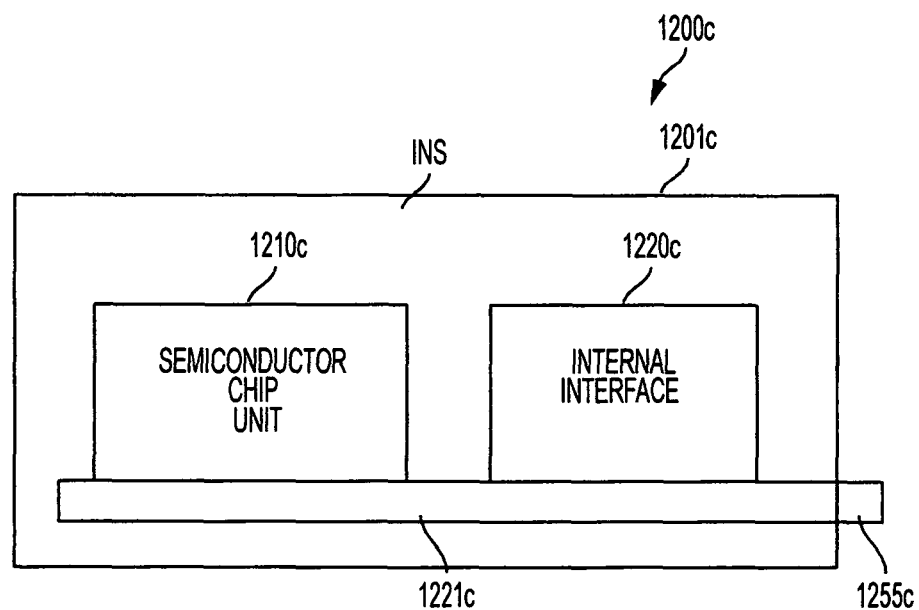

FIGS. 3 and 4 are views respectively illustrating wireless semiconductor devices 300 and 400 as an internal wireless device usable inside an electronic apparatus according to an embodiment of the present general inventive concept. The wireless semiconductor device 300 may include a housing 301, a semiconductor chip unit 310, and an internal interface unit 320 electrically connected to the semiconductor chip unit 310 and wirelessly communicating with an external device 340 which is a component, that is, the third interface unit of the electronic apparatus. The housing 301 may include an insulation material disposed an inside of the housing to surround the semiconductor chip 310 and the internal interface unit 320. It is possible that the housing 301 may include a thermal conductive material to transfer heat from an inside of the housing 301 to an outside of the housing 301. It is also possible that a very thin sintered ferrite sheet with high relative permeability can be attached or covered to a side of an antenna of the internal interface unit 320 to prevent an interference or degradation of the antenna if the internal wireless interface 320 is an NFC interface. The wireless semiconductor device 400 may include a housing 401, a semiconductor chip unit 410, a data interface unit 421 electrically connected to the semiconductor chip unit 410 and communicating with an external device 440a to exchange data, and a power interface unit 422 electrically connected to the semiconductor chip unit 410 and communicating with an external device 440b, that is, a power unit of the electronic apparatus, to receive a power supply therefrom.

When an electronic apparatus detects an internal wireless semiconductor device through interfaces of the electronic apparatus and the internal wireless semiconductor device, a control unit of the electronic apparatus transmits a signal to a semiconductor chip unit through the device an internal interfaces to read data stored in the semiconductor chip unit, and the semiconductor chip unit of the internal wireless semiconductor device reads the data from a memory space thereof and outputs the read data to the control unit of the electronic apparatus through the interfaces. The read may be processed in a processor of the semiconductor chip unit and then wirelessly transmitted to the control unit through the interfaces.

When a wireless communication is established between the interfaces, the semiconductor chip unit automatically reads the data without a signal of the control unit and outputs the read data to the control unit of the electronic apparatus. When the internal wireless semiconductor device is detected, the control unit generates a user interface window on a screen of a display element through a first interface unit thereof to indicate the detection of the internal wireless device in the housing and to provide an option to a user to select whether to read data from the internal wireless device. It is possible that the control unit may include a memory to store information on an internal wireless device according to a user input and then compare the stored information and information of the detected internal wireless device to determine whether to perform a further communication. If the stored information is different from the detected information, a message is generated to inform a user of the difference. It is also possible that a credential confirmation process can be performed during the wireless communication between the internal wireless device and the electronic apparatus.

FIGS. 5, 6, 7, 8, and 9 are views respectively illustrating electronic apparatuses 500, 600, 700, and 800 having one or more wireless electronic devices to perform a wireless communication in an electronic apparatus according to an embodiment of the present inventive concept. The electronic apparatus 500 includes a housing 501, a third interface unit 540, and one or more internal wireless devices 500a, 500b, 500c, and 500d. A controlling/processing unit and first and second interface units are not illustrated in FIG. 5, but are similar to the controlling/processing units of FIGS. 1 and 2. The third interface unit 540 is disposed to wirelessly communicate with the internal wireless devices 500a, 500b, 500c, and 500d. It is possible that the third interface unit 540 may include one or more third sub-interface elements disposed to correspond to the respective internal wireless devices 500a, 500b, 500c, and 500d. The third interface unit 540 is disposed within a distance to enable the wireless communication with the respective internal wireless devices 500a, 500b, 500c, and 500d. For example, the third interface unit 540 and the internal wireless devices 500a, 500b, 500c, and 500d communicate with each other using the near field communication (NFC) technologies, the distance may be a few centimeters, for example, 10 cm (or 3.9 inches) or less, for example.

The electronic apparatus 600 includes a housing 601, a third interface unit 640 including a data interface unit 640a and a power interface unit 640b, and one or more internal wireless devices 600a, 600b, and 600c. The internal wireless devices 600a, 600b, and 600c wirelessly communicate with the data interface unit 640a and also are electrically connected to the power interface unit 640b through electrical conduct or cable 600a1, 600b1, and 600c1, respectively. The data interface unit 640a may include one or more data interface units disposed within a required distance to communicate with the corresponding internal wireless devices 600a, 600b, and 600c.

The electronic apparatus 700 may include a housing 701, a circuit board 701a, a wired semiconductor device 705 electrically connected to the circuit board 701a and also electrically connected to a fourth interface (a wired interface) 741b, and one or more internal wireless devices 700a and 700b to wirelessly communicate with a wireless interface 741a. The wireless interface 741a may include one or more wireless interface units disposed within a required distance to wirelessly communicate with the respective internal wireless devices 700a and 700b. The wired semiconductor device 705 is fixedly mounted at a fixed position of the circuit board 701a, but the internal wireless devices 700a and 700b are not fixedly mounted on the circuit board 701a. That is, the internal wireless devices 700a and 700b are disposed in a space of an inside of the housing 701 within the required distance to enable the wireless communication. When the internal wireless devices 700a and 700b are disposed over the circuit board 701a and when the internal wireless devices 700a and 700b and the wireless interface unit 751b do not overlap over the circuit board 701a, the circuit board 701a may not have conductive lines at positions corresponding to the internal wireless devices 700a and 700b. However, it is possible that when the wireless interface unit 701b and the internal wireless devices 700a and 700b overlap over the circuit board 701a, the wireless interface unit 701b may be formed in the circuit board 701a. In this case, the wired semiconductor device 705 and the interface units 751a and 751b are formed in the circuit board 701a and electrically connected to each other through conductive lines of the circuit board 701a.

The electronic apparatus 800 include a housing 801, a circuit board 801a, a wired semiconductor 804 mounted on the circuit board 801a, a wired interface unit 804 mounted on the circuit board 801a to communicate with the wired semiconductor 805 and also communicate with a controlling/processing unit (not illustrated in FIG. 8), one or more internal wireless devices 800a and 800b disposed at a position other than the circuit board 801a in the housing 801, and a wireless interface 840a connected to a controlling/processing unit to wirelessly communicate with the internal wireless devices 800a and 800b. The wireless interface 840a may include one or more wireless interfaces disposed within a distance from the internal wireless devices 800a and 800b to wirelessly communicate with the respective internal wireless devices 800a and 800b.

The electronic apparatus 900 includes a housing 901, a circuit board 901a, a wired semiconductor 905a fixedly mounted on the circuit board 901 a and electrically connected to conductive lines of the circuit board 901 a, a wired interface (fourth interface) 905b mounted on the circuit board 901a one or more internal wireless devices 900a and 900b, and a wireless interface unit (third interface) 940 electrically connected to the circuit board 901a and wirelessly communicating with the respective internal wireless devices 900a and 900b. The wired/wireless interfaces 905b and 940 are electrically connected to a controlling/processing unit (not illustrated in FIG. 9).

When an electronic apparatus detects an external apparatus through a second interface and an internal wireless device through a third interface, a control unit of the electronic apparatus controls a first interface to display a first message indicating status of communication with the external apparatus and to display a second message indicating status of communication with the internal wireless device, on a screen of a display element. In this case, a user may select the message and control the status of the communication. That is, the user may connect or disconnect the internal wireless device from the electronic apparatus.

FIGS. 10, 11, 12A, 12B, and 12C are views illustrating wireless semiconductor devices 1000, 1100, 1200a, 1200b, and 1200c as an internal wireless device usable in an electronic apparatus according to an embodiment of the present inventive concept. The wireless semiconductor device 1000 includes a housing 1001, a circuit board 1011, a semiconductor chip unit 1010 mounted on the circuit board 1011 and electrically connected to conductive lines of the circuit board 1011, and an internal interface unit (or internal interface) 1020 electrically connected to the conductive lines of the circuit board 1011 and to wirelessly communicate with an external device, for example, a wireless interface unit of an electronic apparatus. The housing 1001 may have a side 1001a to expose at least a portion (or a side) 1020a of the internal interface unit 1020 so that an antenna of the internal interface unit 1020 can be exposed therethrough. The wireless semiconductor device 1000 may include an insulation material INS filled inside the housing 1001 and also may have another insulation material 1011a disposed between the semiconductor chip unit 1010 and the internal interface unit 1020. The insulation material is well known, detail descriptions thereof will be omitted. The insulation material may have a high heat transfer efficiency to discharge heat generated from the wireless semiconductor device. A thin insulation sheet may be partially provided around the housing of the wireless semiconductor device to correspond to an area of an interface to reduce interference of the wireless communication.

The wireless semiconductor device 1100 includes a housing 1101, a circuit board 1111, a semiconductor chip unit 1110 fixedly mounted on the circuit board 1111 and connected to conductive lines of the circuit board 1111, an internal wireless interface unit (internal wireless interface) 1120 fixedly mounted on the circuit board 1111 and electrically connected to the conductive lines of the circuit board 1111 to wirelessly communicate with an external device (an interface of the electronic apparatus), a conductive cable 1155 connected to the conductive line of the circuit board 1111, and a terminal 1155a formed at an end of the conductive cable 1155 and exposed through a side 1101a of the housing 1101 to receive a power supply from a power unit of the electronic apparatus. The internal wireless interface 1120 may have a side having an antenna. The antenna may protrude from the side 1101a of the housing 1101 or disposed in an inside of the housing 1101. The shape of the antenna may vary depending on a type of the internal wireless interface, for example, a WiFi interface, a bluetooth interface, or an NFC interface.

The wireless semiconductor device 1200a includes a housing 1201a, a circuit board 1221a forming a side of the housing 1201, a semiconductor chip unit 1210a mounted at a portion of the circuit board 1221a, and an internal wireless interface unit 1220a mounted at a portion of the circuit board 12121a. The circuit board 1221 a may be a printed circuit board or a flexible circuit board. The housing 1201 may have a side to provide a passage such that a terminal 1255a can protrude from the circuit board 1211a through the side to be connected to a power supply of the electronic apparatus. It is possible that the housing 1201 may have another side to expose an antenna 1220b of the internal wireless interface unit 1220. It is possible that a terminal 1255a is extended from one end of the circuit board 1211 through the side of the housing 1201. In this case, the terminal 1255a may not be formed on the internal wireless interface unit 1220. The housing 1201a may include an insulation material INS surround the semiconductor chip unit 1210a and the internal interface 1220a, and may also include another insulation material 1222 mounted on the circuit board 1221a to provide additional insulation function.

The wireless semiconductor device 1200b includes a housing 1201b, a circuit board 1221b, a semiconductor chip unit 1210*b* mounted on a side of the circuit board 1221*b*, an internal wireless interface unit 1220*b* mounted on an opposite side of the circuit board 1221*b*, a terminal 1255*b* extended from the circuit board 1212*b*, and an antenna formed on the internal wireless interface unit 1220*b*. The antenna may be connected to the internal wireless interface unit 1220 and formed on a surface of the housing 1201*b*. The housing 1201*b* may include an insulation material INS surround the semiconductor chip unit. 1210*b* and the internal interface 1220*b*.

The wireless semiconductor device 1200*c* includes a housing 1201*c*, a circuit board 1221*c*, a semiconductor chip unit 1210*c* mounted on the circuit board 1221*c*, an internal wireless interface unit 1220*c* mounted on the circuit board 1221*c*, a cable or terminal 1255*c* extended from the circuit board 1221 c to be connectable to a power supply of the electronic apparatus, and an antenna formed on a side of the internal wireless interface unit 1220. An insulation material INS may be filled inside a housing 1201*c* to cover the circuit board 1221*c*, the semiconductor chip unit 1210*c*, and the internal wireless interface unit 1220*c*.

The wireless semiconductor devices 1000, 1100, 1200*a*, 1200*b*, 1200*c* may have a battery unit therein to receive a power supply through an internal wireless interface unit using a wired or wireless method from an electronic apparatus, to store the power supply, and to supply the power to a semiconductor chip unit and the internal interface unit.

Although the wireless semiconductor devices 1000, 1100, 1200*a*, 1200*b*, and 1200*c* are illustrated to include a semiconductor chip unit, it is possible that the semiconductor chip unit can be a semiconductor package which include one or more semiconductor chips. The semiconductor chips may include at least one processor and at least one memory so that data can be stored and the data can be wirelessly transmitted to an external device of the electronic apparatus through the internal wireless interface unit.

Figure 13:
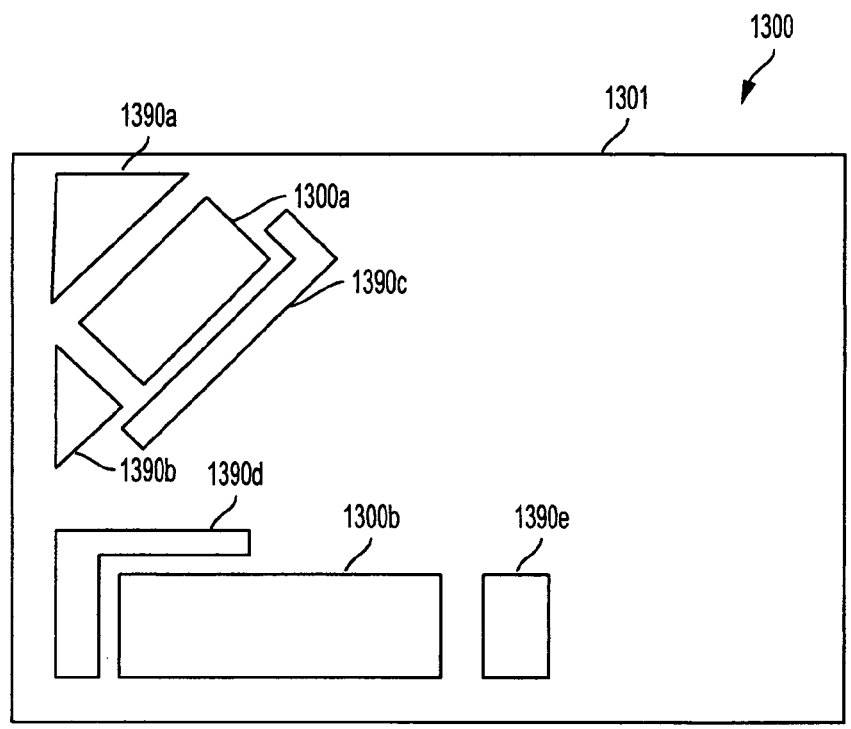
FIGS. 13, 14, and 15 are views illustrating an electronic apparatus having one or more internal wireless devices to perform a wireless communication in the electronic apparatus according to an embodiment of the present inventive concept.
Figure 14:
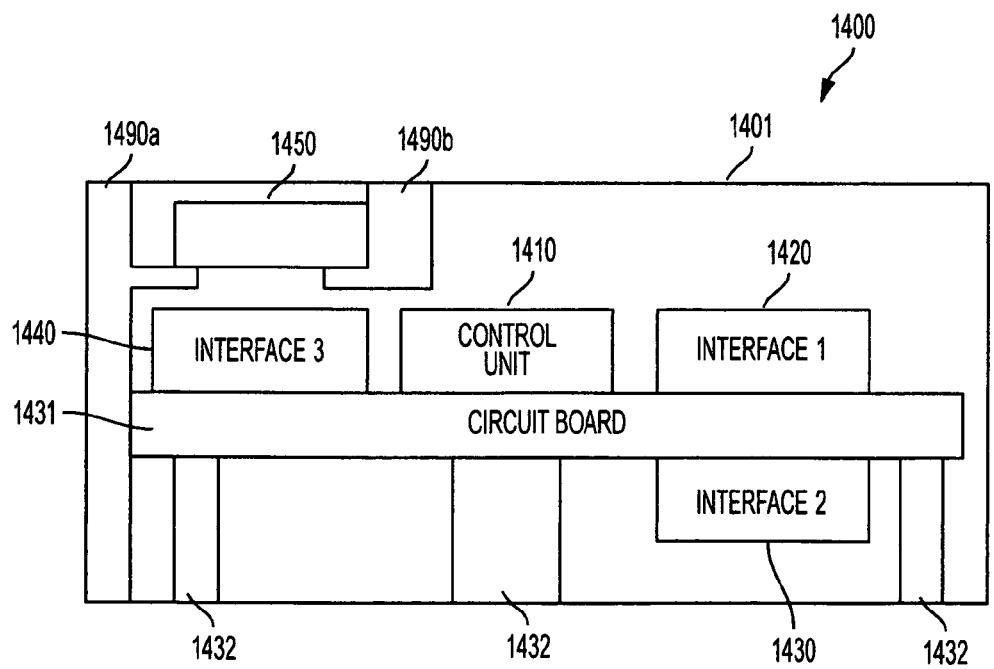
Figure 15:
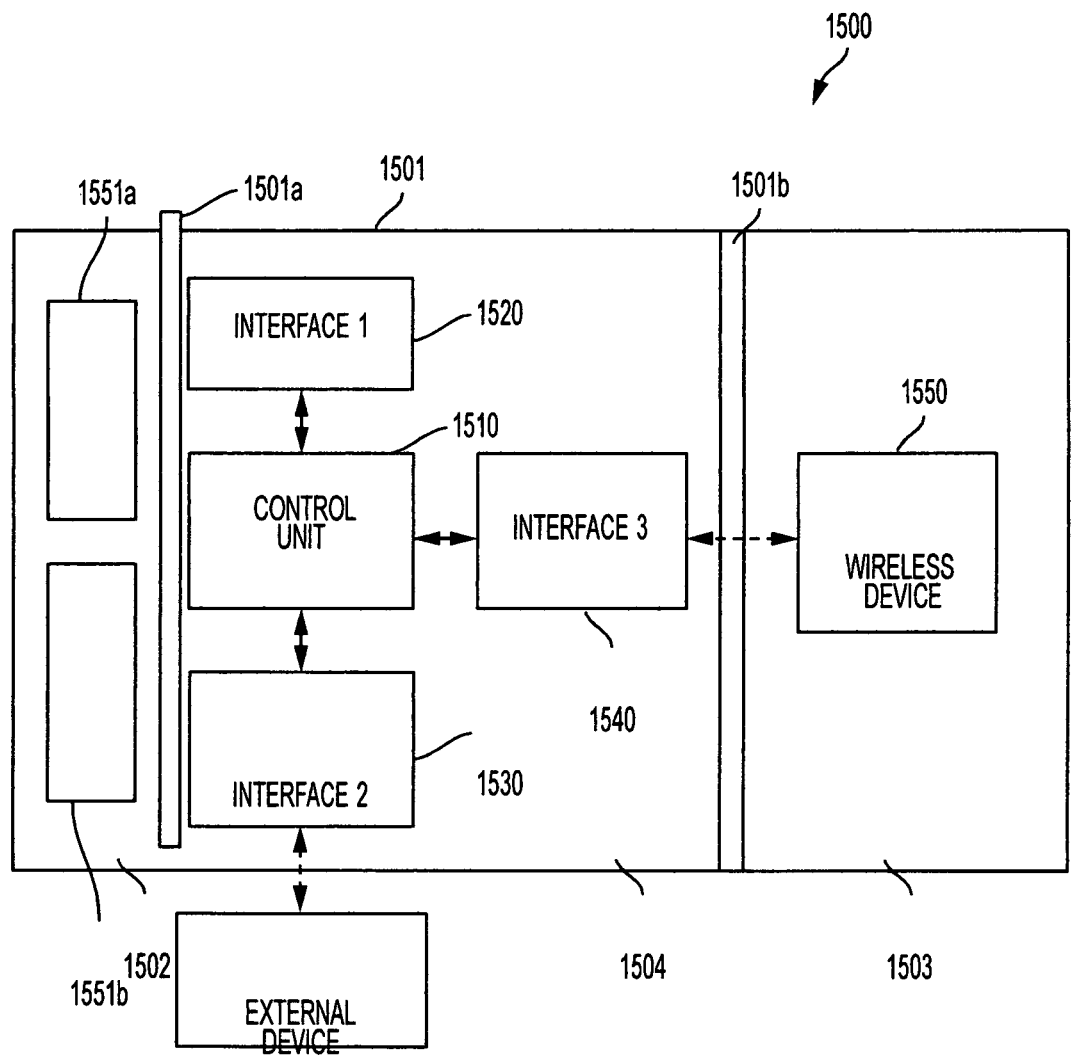

FIGS. 13, 14, and 15 are views illustrating electronic apparatuses 1300, 1400, and 1500 having one or more wireless electronic devices disposed in a housing of the respective electronic apparatuses 1300, 1400, and 1500 to perform a wireless communication in the electronic apparatus according to an embodiment of the present inventive concept. The electronic apparatus 1300 may include a housing 1301, one or more internal wireless devices 1300*a* and 1300*b* disposed inside the housing 1301, and stoppers 1390*a*, 1390*b*, 1390*c*, 139*d*, and 1390*e* disposed to prevent or restrict a movement of the internal wireless devices 1300*a* and 1300*b* within a space of the housing 1301. The stopper 1390*a* may be disposed between a corner of the housing 1301 and a side of the internal wireless device 1300*a*. The stopper 1390*b* is disposed to cover a side of the internal wireless device 1300*a*. The stopper 1390*c* is disposed to cover or surround two or more sides of the internal wireless device 1300*a*. The stopper 1390*d* is disposed to cover a corner of the internal wireless device 1300*b*. The stopper 1390*e* is disposed to cover at least one side of the internal wireless device 1300*b* such that a position of the internal wireless device 1300*b* can be maintained between a side of the housing 1301 and the stopper 1390*e*. The stoppers 1390*a*, 1390*b*, 1390*c*, 139*d*, and 1390*e* may be an elastic material and mounted on respective positions of the housing 1301. Although not illustrated in FIG. 13, an interface unit of the electronic apparatus 1300 is disposed in the housing 1301 at a position to perform a wireless communication with the internal wireless devices 1300*a* and 1300*b*, interface units are disposed in the housing 1301 to communicate with a user and an external apparatus, and a controlling/processing unit is disposed in the housing 1301 electrically connected to the interface units.

The electronic apparatus 1400 may include a housing 1401, an internal wireless device 1450, stoppers 1490*a* and 1490*c*, a circuit board 1431, first and second interface 1420 and 1430 mounted on the circuit board 1490*c*, a third interface 1440 mounted on the circuit board 1431 to communicate with the internal wireless device 1450, and a controlling/processing unit (or control unit) 1410 to control functions of the interfaces and functional components (not illustrated) of the electronic apparatus 1400. The stopper 1490*a* is mounted on a first side of the housing 1401 and the stopper 1490*b* is mounted on a second side of the housing 1402 such that the internal wireless device 1450 can be supported with the housing 1401. The circuit board 1431 may be maintained at a position within the housing 1401 by one or more supports 1432. It is possible that the third interface 1440 and the controlling/processing unit 1410 may be disposed on a same side of the circuit board 1490*c*. The present general inventive concept is not limited thereto. It is possible that the third interface 1440 and the controlling/processing unit 1410 may be disposed on opposite sides of the circuit board 1431. It is also possible that the first interface 1420 and the second interface 1430 may be disposed at opposite sides of the circuit board 1431. Although not illustrated, a stopper can be disposed between the housing 1401 and a top surface of the internal wireless device 1450.

The electronic apparatus 1500 may include a housing 1501 having a first partition 1501*a* and a second partition 1501*b* to define a first space 1502 and a second space 1503, respectively. A third space 1504 may be defined between the first partition 1501*a* and the second partition 1501*b*. A control unit 510 and first, second, and third interfaces 1520, 1530, and 1540 are disposed in the third space 1504. The control unit 1510 may correspond to a controlling/processing unit and may be electrically connected to one or more wired semiconductor units 1551*a* and 1551*b* disposed in the first space 1502. The second interface 1530 communicates with an external device or apparatus disposed outside the housing 1501. An internal wireless device (for example, an internal wireless semiconductor device) 1550 is disposed in the second space 1503. The wired semiconductor unit 1551 and the internal wireless device 1550 are disposed opposite sides of the housing 1501 with respect to the third space. The partitions 1501*a* and 1501*b* may be an insulation material. The partitions 1501*a* and 1501*b* may not completely isolate the spaces 1502, 1503, and 1504 but may have one or more portions to allow communication among the spaces 1502, 1503, and 1504.

An internal wireless semiconductor device may have a shape or dimension different from another internal wireless semiconductor device. Accordingly, an electronic apparatus may have a space provided in a housing to accommodate different shapes dimensions of the different internal wireless semiconductor devices. Also the electronic apparatus may not have to provide different data terminals at fixed positions to connect the respective internal wireless semiconductor devices. An internal wireless semiconductor device may be replaced with a new internal wireless semiconductor device with different shape or dimension within a designated space of the housing of the electronic apparatus. The internal wireless semiconductor device may have one or more processors or one or more memories according to a user or design preference.

If the housing has a door, a user opens the door and inserts the internal wireless semiconductor device into the housing through the door. The door may have a lock to be locked onto the housing to be disposed at a lock position or closed position. Since the housing is provided with stoppers (elastic stoppers with elasticity or contraction or expansion characteristic) in the space thereof, a movement of the inserted internal wireless semiconductor device can be restricted. A location or dimension of the stoppers may be adjustable with respect to the housing to fit into the shape and dimension of the inserted internal wireless semiconductor device. When the internal wireless semiconductor device is disposed in the housing, interfaces of the internal wireless semiconductor device and the electronic apparatus performs wireless communication accordingly.

Figure 16:
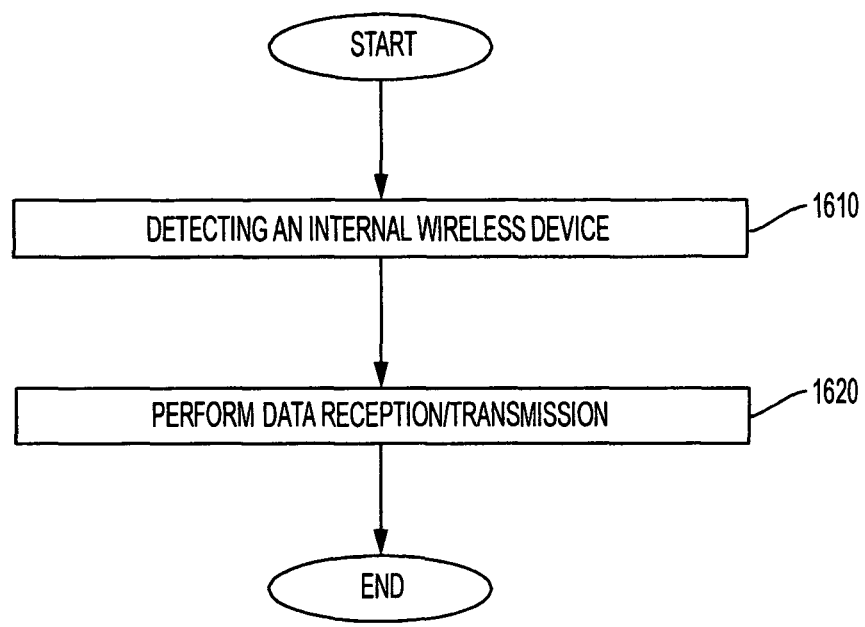
FIGS. 16, 17, and 18 are flowcharts illustrating a method of performing a function according to an internal wireless device provided in a housing of an electronic apparatus and perform a wireless communication according to an embodiment of the present general inventive concept.
Figure 17:
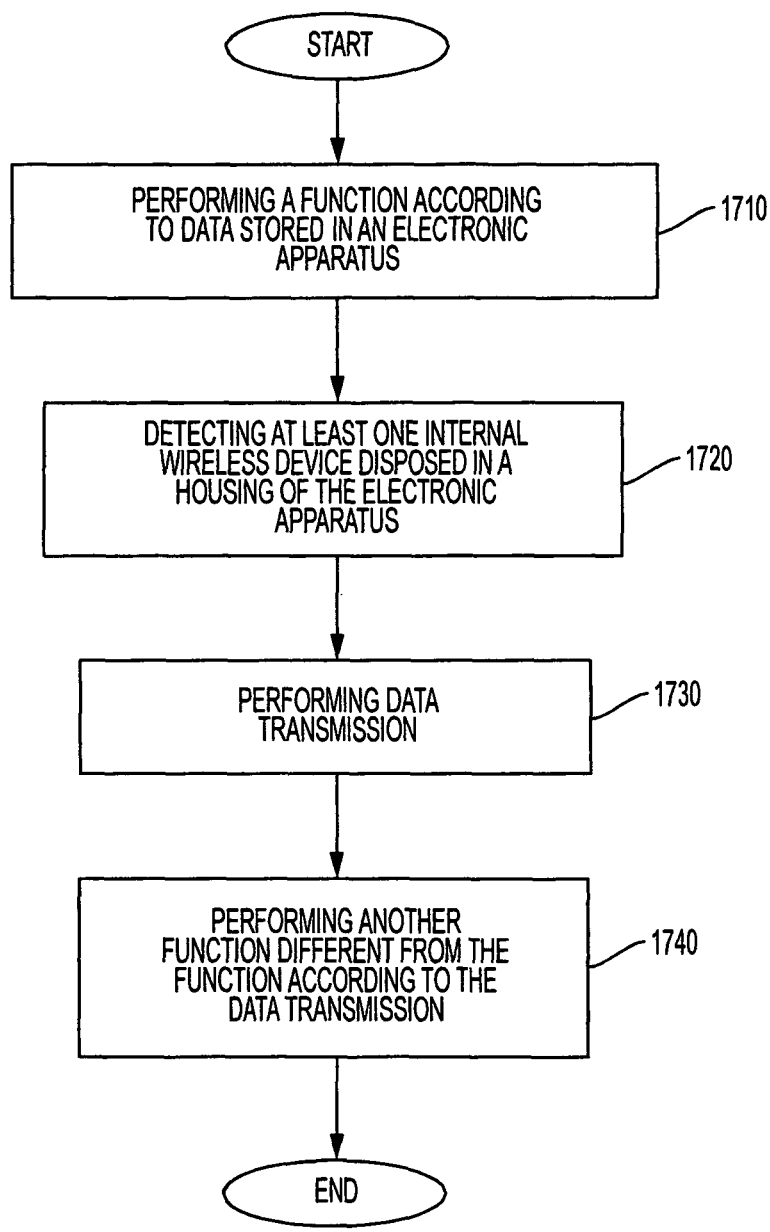
Figure 18:
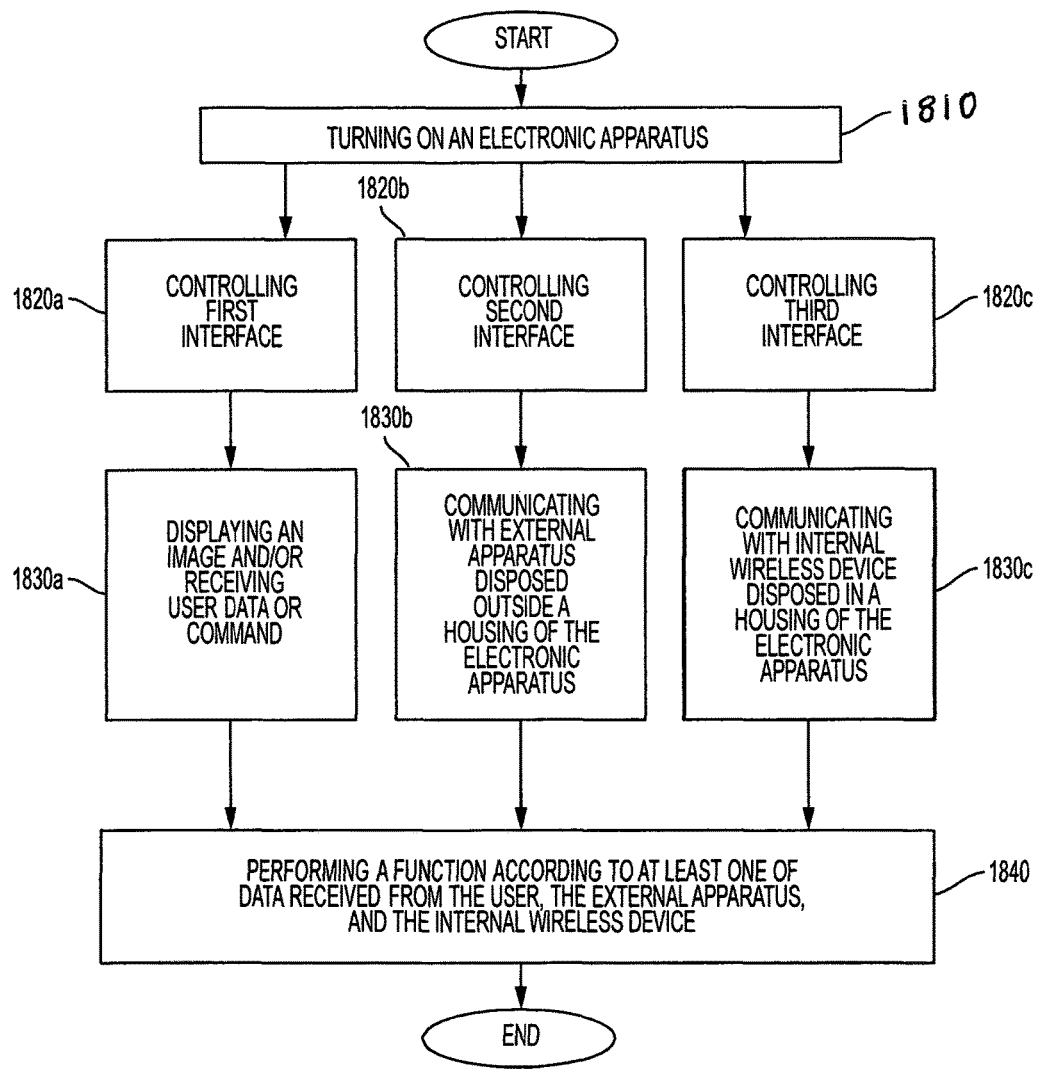

FIGS. 16, 17, and 18 are flowcharts illustrating a method of performing a function of an electronic apparatus according to data of an internal wireless device provided in a housing of the electronic apparatus according to an embodiment of the present general inventive concept. Referring to FIG. 16, when a controlling/processing unit detects an internal wireless device disposed within a housing of the electronic apparatus in operation 1610, data and/or power transmission is performed between the internal wireless device and the controlling/processing unit through an interface in operation 1620.

Referring to FIG. 17, a basic function of an electronic apparatus is performed using data stored in a memory of the electronic apparatus in operation 1710. When an internal wireless device is detected in a housing of the electronic apparatus in operation 1720, data transmission is performed between the internal wireless device and a controlling/processing unit of the electronic apparatus in operation 1730. Another function other than or modified from the basic function is performed according to the data of the internal wireless device in operation 1740. The controlling/processing unit controls components such that the basic function may be performed according to data stored in a memory of the electronic apparatus, and the another function is performed according to the data of the internal wireless device and at least a portion of also the data stored in the memory.

Referring to FIG. 18, when an electronic apparatus is turned on in operation 1810, a controlling/processing unit controls a first interface to communicate with a user in operation 1820*a*, a second interface to communicate with an external apparatus in operation 1820*b*, and a third interface to wirelessly communicate with an internal wireless device disposed in a housing of the electronic apparatus in operation 1820*c*.

The controlling/processing unit controls the first interface and corresponding components to display an image and/or receive user data or command in operation 1830*a*, the second interface and components to communicate with an external apparatus disposed outside the housing of the electronic apparatus in operation 1830*b*, and the third interface and components to communicate with the internal wireless device disposed in the housing in operation 1830*c* to receive or transmit data. The controlling/processing unit processes data of an internal memory and data of the internal wireless device, and performs a function according to the processed data and/or at least one of data received from the user, the external apparatus, and the internal wireless device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor device, a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As illustrated above, the present general inventive concept provides an electronic apparatus having a housing and first, second, and third interface units disposed in the housing to communicate with a user, an external apparatus, and an internal wireless device disposed in the housing, respectively. The internal wireless device ay have a sub-housing containing a circuit board, a semiconductor chip unit mounted on the circuit board, and an internal wireless interface unit mounted on the circuit unit and electrically connected to the semiconductor chip unit. The electronic apparatus may further include a controlling/processing unit disposed in the housing to control the first interface unit to communicate with a user, to control the second interface unit to communicate with an external apparatus, and to control the third interface unit to wirelessly communicate with the internal wireless interface of the internal wireless device to transmit or receive data when the internal wireless device exists in the housing.

Also as illustrated above, the present general inventive concept provides a method of performing an operation of an electronic apparatus, the method including providing first, second, and third interface units in the housing, providing an internal wireless device having a sub-housing containing a circuit board, a semiconductor chip unit mounted on the circuit board, and an internal wireless interface unit mounted on the circuit unit and electrically connected to the semiconductor chip unit, controlling the first interface unit to communicate with a user, controlling the second interface unit to communicate with an external apparatus, and controlling the third interface unit to wirelessly communicate with the internal wireless interface of the internal wireless device to transmit or receive data when the internal wireless device exists in the housing.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An electronic apparatus having a housing, comprising:
   a first interface unit disposed in the housing and configured to communicate with a user outside the housing;
   a second interface unit disposed in the housing and configured to communicate with an external device disposed outside the housing;
   a third interface unit disposed in the housing and configured to wirelessly communicate with a wireless device disposed inside the housing;

an internal wireless device being the wireless device inside the housing, having a sub-housing containing a circuit board, a semiconductor chip unit mounted on the circuit board, and an internal wireless interface unit mounted on the circuit board and electrically connected to the semiconductor chip unit; and a controlling/processing unit disposed in the housing, configured to control the first interface unit to communicate with the user, configured to control the second interface unit to communicate with the external apparatus, and configured to control the third interface unit to wirelessly communicate with the internal wireless interface unit of the internal wireless device to transmit or receive data between the third interface unit and the internal wireless device when the internal wireless device exists in the housing.

2. The electronic apparatus of claim 1, wherein the semiconductor chip unit and the internal wireless interface unit are disposed on a same side of the circuit board.

3. The electronic apparatus of claim 1, wherein the semiconductor chip unit and the internal wireless interface unit are disposed on opposite sides of the circuit board.

4. The electronic apparatus of claim 1, wherein the circuit board is exposed through a portion of the sub-housing.

5. The electronic apparatus of claim 1, wherein the internal wireless interface unit includes a data interface and a power interface.

6. The electronic apparatus of claim 1, wherein the internal wireless interface unit includes an antenna disposed to face the third interface unit inside the housing.

7. The electronic apparatus of claim 1, wherein the internal wireless interface unit includes a terminal extended through the sub-housing.

8. The electronic apparatus of claim 1, wherein the housing comprises a cover through which the internal wireless device passes through so that the internal wireless device is inserted into a space inside the housing.

9. The electronic apparatus of claim 1, wherein the internal wireless interface unit and the third interface unit communicate with each other using near field communication.

10. The electronic apparatus of claim 1, wherein the internal wireless device is movably disposed within a space of the housing.

11. The electronic apparatus of claim 1, further comprising:
a main circuit board,
wherein the first, second, and third interface units are fixedly mounted on the main circuit board.

12. The electronic apparatus of claim 1, further comprising:
a partition formed in the housing to define a space to accommodate the internal wireless device.

13. The electronic apparatus of claim 1, further comprising:
a main circuit board disposed in a first space of the housing and mounted with the first, second, and third interface units,
wherein the internal wireless device is disposed in a second space of the housing.

14. The electronic apparatus of claim 1, wherein the internal wireless device comprises a semiconductor package having a processor and a memory.

15. The electronic apparatus of clam 1, wherein the internal wireless device comprising an insulation material filled in the sub-housing.

16. An electronic apparatus having a housing, comprising:
a first interface unit disposed in the housing and configured to communicate with a user outside the housing;
a second interface unit disposed in the housing and configured to communicate with an external device outside the housing;
a third interface unit disposed in the housing and configured to wirelessly communicate with a wireless device disposed inside the housing;
an internal wireless device being the wireless device inside the housing, and having a sub-housing containing a circuit board, a semiconductor chip unit mounted on the circuit board, and an internal wireless interface unit mounted on the circuit board and electrically connected to the semiconductor chip unit; and
a controlling/processing unit disposed in the housing, configured to control the first interface unit to communicate with the user, configured to control the second interface unit to communicate with the external apparatus, and configured to control the third interface unit to wirelessly communicate with the internal wireless interface of the internal wireless device and to transmit or receive data when the internal wireless device exists in the housing,
wherein the internal wireless device comprises one or more internal wireless devices movably disposed in the housing without being fixedly coupled to the housing.

17. The electronic apparatus of claim 16, wherein the internal wireless interface unit further comprises a terminal extended through the sub-housing, and the terminal is disposed in the housing when the internal wireless interface unit is disposed in the hosuing.

18. The electronic apparatus of claim 16, wherein the internal wireless device further comprises a semiconductor package having a processor and a memory, and the insulation material covers the semiconductor package.

19. An electronic apparatus having a housing, comprising:
a first interface unit disposed in the housing and configured to communicate with a user outside the housing;
a second interface unit disposed in the housing and configured to communicate with an external device outside the housing;
a third interface unit disposed in the housing and configured to wirelessly communicate with a wireless device disposed in the housing;
an internal wireless device being the wireless device in the housing, and having a sub-housing containing a circuit board, a semiconductor chip unit mounted on the circuit board, and an internal wireless interface unit mounted on the circuit board and electrically connected to the semiconductor chip unit;
a controlling/processing unit disposed in the housing, configured to control the first interface unit to communicate with the user, configured to control the second interface unit to communicate with the external apparatus, and configured to control the third interface unit to wirelessly communicate with the internal wireless interface of the internal wireless device to transmit or receive data when the internal wireless device exists in the housing; and
one or more stoppers disposed in the housing and configured to restrict a movement of the internal wireless device.

20. The electronic apparatus of claim 19, wherein the internal wireless interface unit further comprises a terminal extended through the sub-housing, and the terminal is disposed in the housing when the internal wireless device is disposed in the hosuing.

* * * * *